(12) United States Patent
Chen et al.

(10) Patent No.: US 7,604,305 B2
(45) Date of Patent: Oct. 20, 2009

(54) COMPUTER ENCLOSURE WITH PIVOTING COVERS

(75) Inventors: Yun-Lung Chen, Tu-Cheng (TW); Yi-Chung Hsiao, Tu-Cheng (TW); Ming-Xian Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 701 days.

(21) Appl. No.: 11/321,586

(22) Filed: Dec. 29, 2005

(65) Prior Publication Data

US 2007/0001560 A1    Jan. 4, 2007

(30) Foreign Application Priority Data

Jul. 1, 2005   (CN) .................... 2005 2 0061098 U

(51) Int. Cl.
*A47B 97/00* (2006.01)

(52) U.S. Cl. .................................. 312/223.2

(58) Field of Classification Search ............. 312/223.1, 312/223.2, 283, 290, 257.1, 324; 292/32, 292/37, 42, 145, 146, 150, 302, DIG. 11, 292/DIG. 37; 361/681, 724, 726, 679.01, 361/679.33
See application file for complete search history.

(56) References Cited

U.S. PATENT DOCUMENTS

| | | | | |
|---|---|---|---|---|
| 1,573,466 A | * | 2/1926 | Ward | 312/299 |
| 2,739,863 A | * | 3/1956 | Ferris | 312/231 |
| 4,785,971 A | * | 11/1988 | Konarik | 221/312 R |
| 4,896,070 A | * | 1/1990 | Reid et al. | 312/290 |
| 4,909,579 A | * | 3/1990 | Liu | 312/223.2 |
| 5,102,209 A | * | 4/1992 | Hesseltine | 312/290 |
| 5,465,191 A | * | 11/1995 | Nomura et al. | 361/681 |
| 5,497,296 A | * | 3/1996 | Satou et al. | 361/681 |
| 6,129,429 A | * | 10/2000 | Hardt et al. | 312/223.2 |
| 6,381,138 B1 | | 4/2002 | Chen | |
| 6,571,948 B2 | * | 6/2003 | Jones | 206/320 |
| 6,707,665 B2 | * | 3/2004 | Hsu et al. | 361/681 |

FOREIGN PATENT DOCUMENTS

TW    438213    5/2001

* cited by examiner

*Primary Examiner*—James O Hansen
(74) *Attorney, Agent, or Firm*—Clifford O. Chi

(57) ABSTRACT

A computer enclosure includes a chassis, a top cover pivotally mounted to the chassis, a side cover pivotally mounted on the chassis, a pair of springs, and a locating member slidably mounted to the side cover. The top cover is formed to have at least one catch thereon. The side cover, the chassis, and the top cover configure a receiving space for accommodating other components. The locating member defines at least one latching opening therein for engaging with the catch. When the top cover is pivoted downward, the catch of the top cover engages in the latching opening of the locating member firmly, thereby interlocking the top cover and the side cover detachably.

13 Claims, 4 Drawing Sheets

COMPUTER ENCLOSURE WITH PIVOTING COVERS

BACKGROUND OF THE INVENTION

1. Field of the Invention

The present invention relates to a computer enclosure, and more particularly to a computer enclosure with pivotally attached interlocking top cover and side cover.

2. General Background

With the popularization of computers, computers have come to be intensively used in different fields and industries for a variety of purposes. In order to be more competitive, manufacturers are making computer enclosures more compact and with detachable parts for greater access for installation and maintenance of components within the enclosure. A conventional computer enclosure includes a chassis, a front bezel and a cover, all of which are separate parts. In assembly, the front bezel and the cover are directly secured to the chassis with screws. In order to remove the cover from the chassis, the screws must be disengaged from the chassis one by one. This is unduly laborious and time-consuming.

An example of a typical computer enclosure with a side cover locking/unlocking control arrangement includes a computer chassis, the computer chassis having a vertical flange, a horizontal top flange, and a horizontal bottom flange around a side opening thereof, a side cover adapted to cover the side opening of the computer chassis, and two control levers respectively mounted on the side cover and adapted to lock/unlock the side cover, each control lever having a handle unit for operation by hand to turn the respective control lever between the locking position and the unlocking position, and an actuating unit pivotally attached to the side cover, the actuating unit having a protruded guide rod inserted into a respective curved sliding slot on the vertical flange and stopped at one end of the respective curved sliding slot. However, the configuration of the computer chassis and the side cover locking/unlocking control arrangement is complex, and the computer chassis has not enough room for the larger electronic components entering therein because a top panel of the computer chassis remains in place.

What is needed, therefore, is a computer enclosure with pivotally attached interlocking top cover and side cover.

SUMMARY

A computer enclosure includes a chassis, a top cover pivotally mounted to the chassis, a side cover pivotally mounted on the chassis, a pair of springs, and a locating member slidably mounted to the side cover. The top cover is formed to have at least one catch thereon. The side cover, the chassis, and the top cover configure a receiving space for accommodating other components. The locating member defines at least one latching opening therein for engaging with the catch. When the top cover is pivoted downward, the catch of the top cover engages in the latching opening of the locating member firmly, thereby interlocking the top cover and the side cover detachably.

Other advantages and novel features will be drawn from the following detailed description of preferred embodiments with the attached drawings, in which:

DETAILED DESCRIPTION OF THE EMBODIMENTS

An enclosure of an electronic device like a computer in accordance with a first preferred embodiment generally applies to personal computers, mini-personal computers, servers, and other similar devices.

Figure 1:
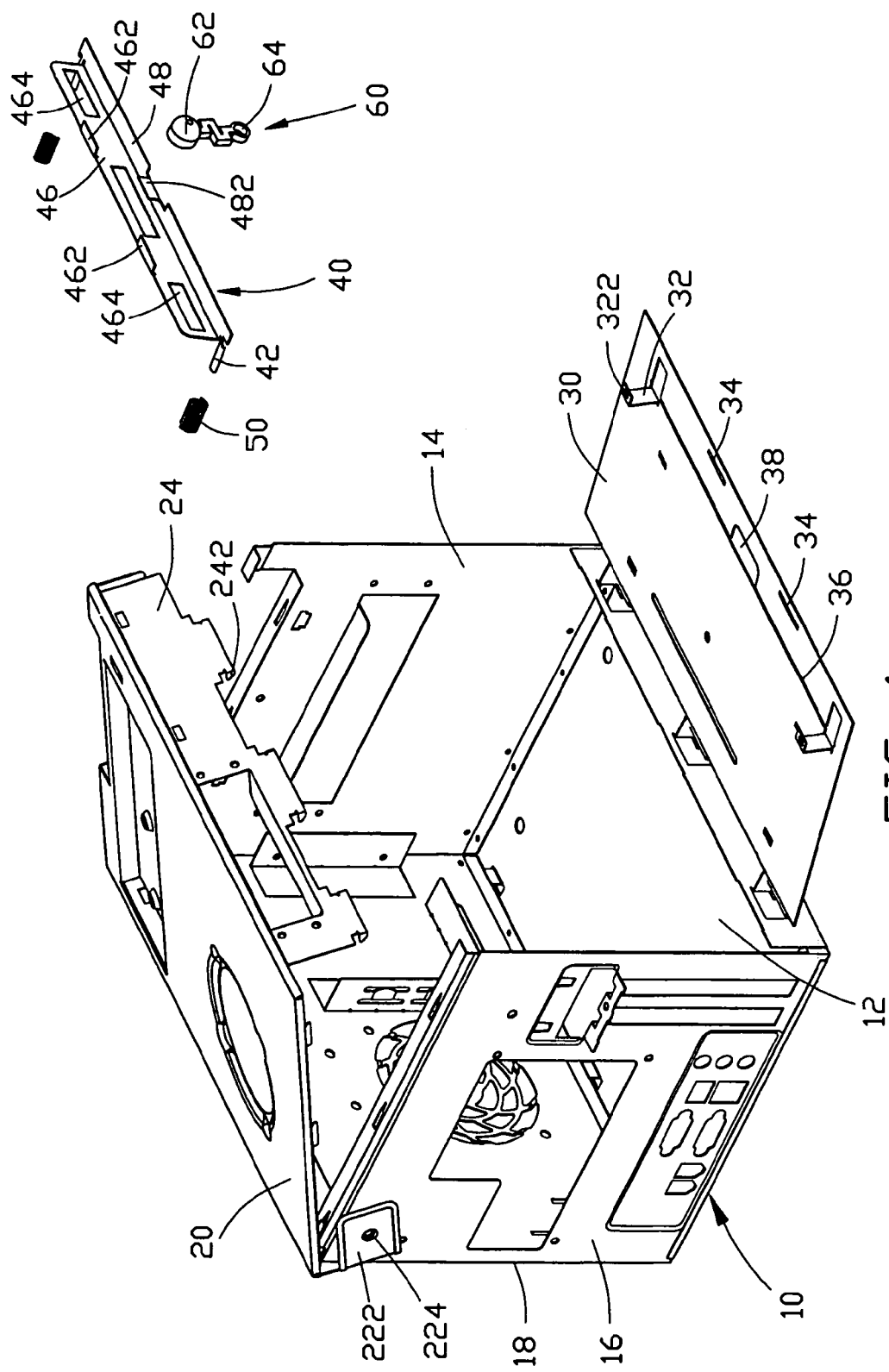
FIG. 1 is an exploded, isometric view of a computer enclosure in accordance with a first preferred embodiment of the present invention, the computer enclosure including a chassis, a top cover, a side cover, a locating member, a pair of springs, and a button.

Referring to FIG. 1, a computer enclosure in accordance with a first preferred embodiment of the present invention includes a chassis 10, a top cover 20, a side cover 30, a locating member 40, a pair of springs 50, and a button 60. In an alternative embodiment of the present invention, the springs 50 can be other elastic components such as resilient cylinders. The chassis 10, the top cover 20, and the side cover 30 are made of metallic material (for example, Fe, Al, Mg, or an alloy thereof). Plastic plates may be mounted on outside walls of the chassis, the top cover, and the side cover for decoration.

The chassis 10 has a bottom wall 12, a front wall 14 perpendicular to the bottom wall 12, a rear wall 16 parallel to the front wall 14, and a sidewall 18 connected vertically with the front wall 14 and the rear wall 16.

The top cover 20 is pivotally mounted on the chassis 10. Two opposites ends of the top cover 20 are bent down to form two flanges 22, 24 respectively (shown in FIG. 3). Two opposite ends of the flange 22 are bent vertically inward to form two folding tabs 222. Each of the folding tabs 222 defines a pivot hole 224 therein. A rod (not shown) extends through one of the pivoting holes 224 adjacent the rear wall 16, and a through hole defined in the rear wall 16. Similarly, another rod (not shown) extends through the other pivot hole 224 adjacent the front wall 14, and a through hole defined in the front wall 14, thereby the top cover 20 is pivotally attached to the chassis 10. The bottom end of the flange 24 is formed to have a plurality of catches 242 thereon.

The side cover 30 is pivotally mounted to the bottom wall 12 of the chassis 10. The side cover 30 is stamped to form a pair of L-shaped positioning tabs 32. Each of the L-shaped positioning tabs 32 defines a locating hole 322 therein. An upper portion of the side cover 30 defines a pair of narrow through slots 34 therein. The side cover 30 defines a narrow elongated opening 36 therein below the narrow through slots 34. A cutout 38 is defined in the side cover 30, and is connected with the elongated opening 36.

A pair of positioning posts 42 extends horizontally from the locating member 40 for the two springs 50 being disposed thereon. The locating member 40 has a vertical portion 46 and a horizontal portion 48 connected with the vertical portion 46. A pair of insert tabs 462 extends horizontally from the vertical portion 46 corresponding to the through slots 34. A plurality of latching openings 464 is defined in the vertical portion 46. A stopping tab 482 extends vertically from the horizontal portion 48 corresponding to the cutout 38.

The button 60 may be mounted on the side cover 30, or an outside plastic plate. The button 60 has a pressing portion 62 for resisting against the stopping tab 482 to urge the locating member 40 to move, and a mounting portion 64 for mounting the button 60.

Figure 2:
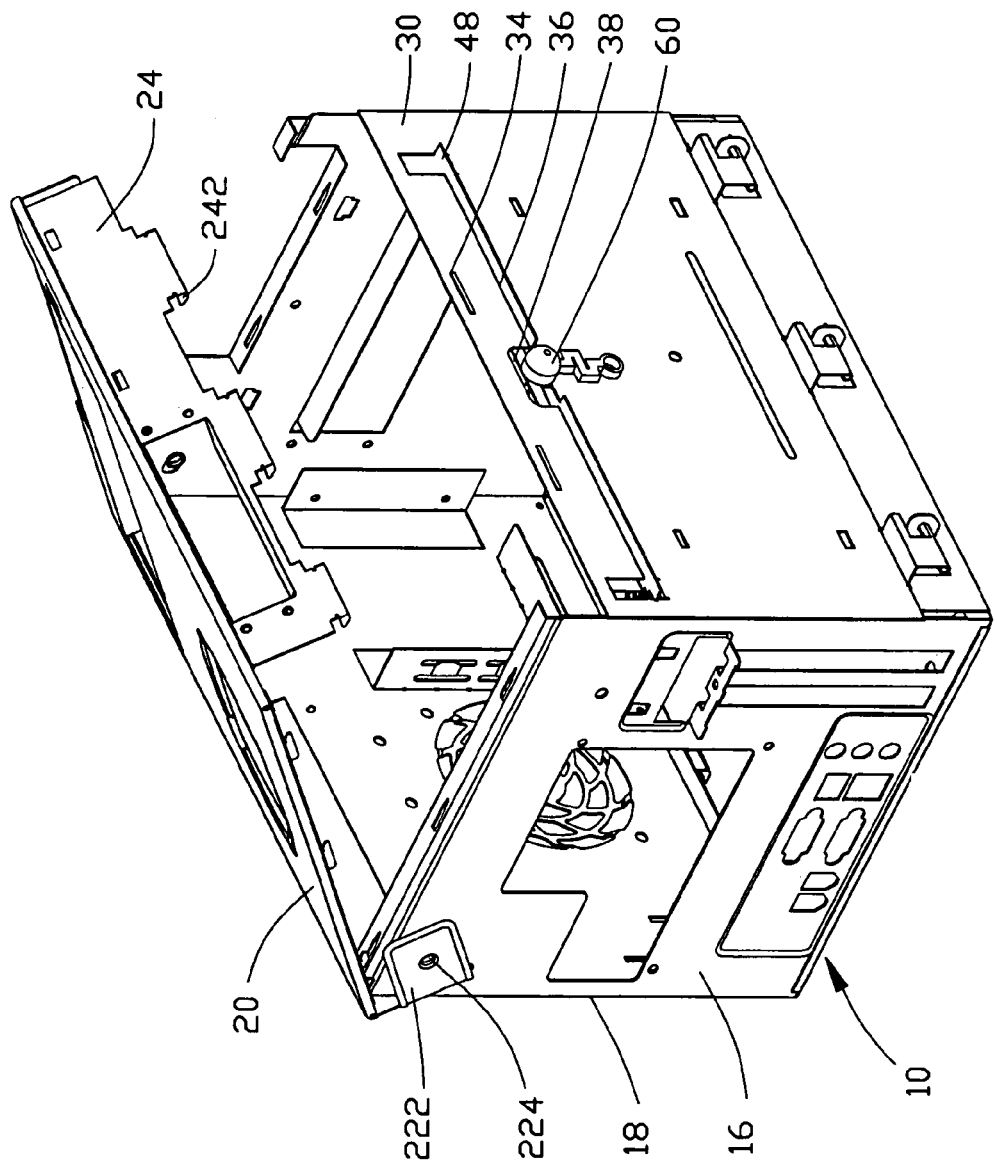
FIG. 2 is an assembled view of the computer enclosure of FIG. 1, with the top cover pivoted away from the side cover.

Referring to FIG. 2, in attachment of the locating member 40 to the side cover 30, the two springs 50 are first disposed on the positioning posts 42 of the locating member respectively. The locating member 40 is slanted to urge the horizontal portion 48 of the locating member 40 to insert into the elongated opening 36 of the side cover 30. Simultaneously, the stopping tab 482 of the locating member 40 extends through the cutout 38 of the side cover 30, and the insert tabs 462 of the locating member 40 insert into the corresponding through slot 34 of the side cover 30. Then, the two springs 50 are both compressed, and the positioning posts 42 of the locating member 40 extend through the corresponding locating holes 322 of the positioning tabs 32. Thus, the locating member 40 is movably mounted to the side cover 30.

Figure 3:
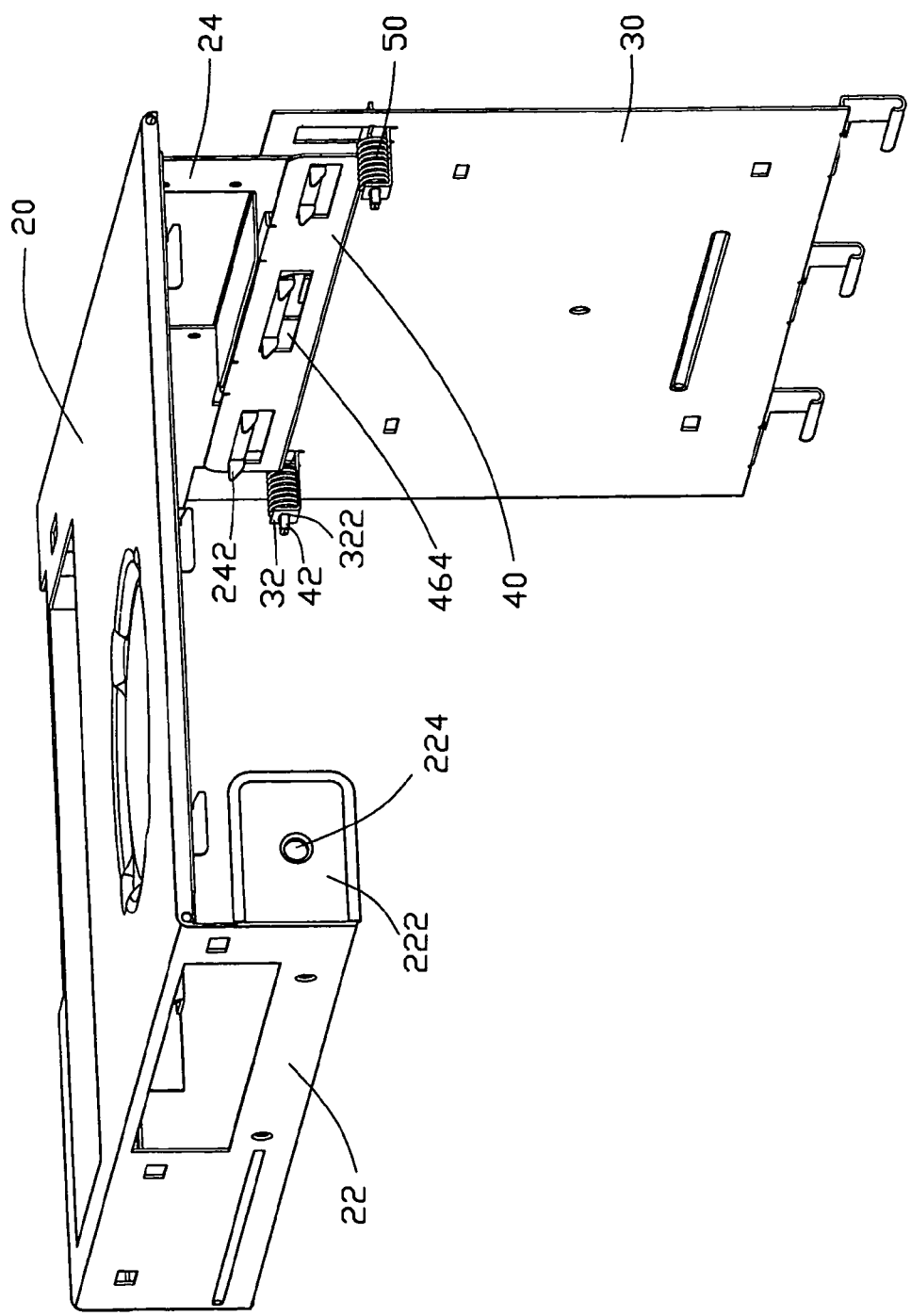
FIG. 3 is an partially assembled view of the computer enclosure of FIG. 1, with the top cover and the side cover interlocked.
Figure 4:
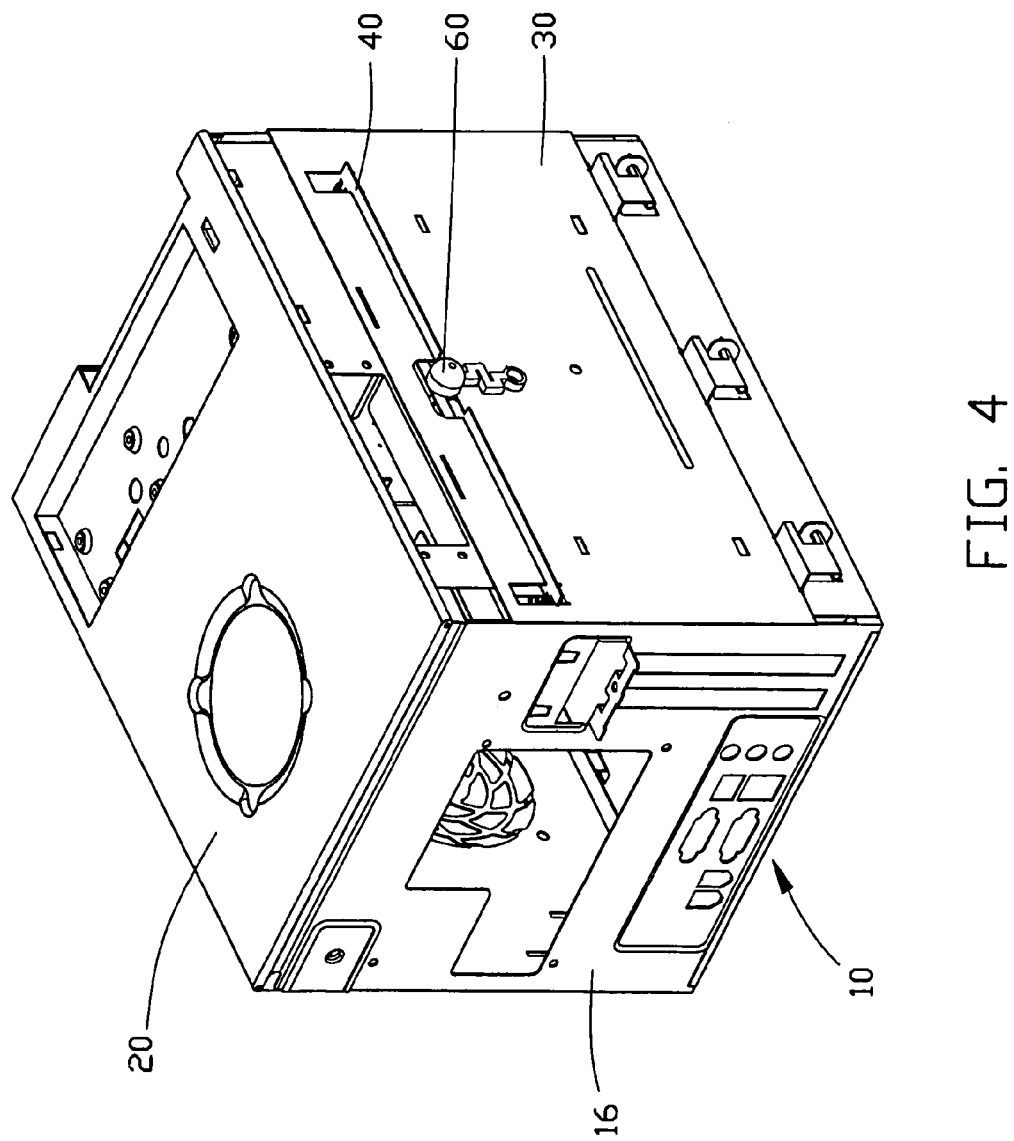
FIG. 4 is an assembled view of the computer enclosure of FIG. 1.

Referring to FIG. 3, in attachment of the top cover 20 to the side cover 30, the top cover 20 is pivoted downward to urge the catches 242 of the top cover 20 to align with a gap defined between the locating member 40 and the side cover 30. The top cover 20 is continuatively pivoted downward. The catches 242 resist against the locating member 40, and push the locating member 40 to move horizontally inward. Simultaneously, the springs 50 are both compressed. The top cover 20 is further pivoted downward. The catches 242 engagingly insert in the corresponding latching openings 464. Thus, the top cover 20 interlocks with the side cover 30 detachably.

In detachment of the top cover 20 from the side cover 30, the pressing portion 62 of the button 60 is first pressed. The pressing portion 62 of the button 60 pushes the stopping tab 482 of the locating member 40 to move horizontally inward, thereby urging the catches 242 of the top cover 20 to disengage from the corresponding latching openings 464 of the locating member 40. Then, the top cover 20 readily disengages from the side cover 30 when the top cover 20 is pivoted upward.

In addition, in other embodiments of the present invention, the top cover 20 and the locating member 40 may be modified. For example, the catches formed on the locating member, and the latching openings defined in the flange of the top cover. Therefore, in like manner, the top cover carries out an engagement with the side cover.

While the present invention has been illustrated by the description of preferred embodiments thereof, and while the preferred embodiments have been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

We claim:

1. A computer enclosure comprising:
    a chassis;
    a top cover pivotally mounted to the chassis, the top cover having at least one catch;
    a side cover pivotally mounted to the chassis; the side cover, the chassis, and the top cover configuring a receiving space for accommodating other components; and
    a locating member slidably mounted on the side cover, the catch engaging with the locating member, whereby when the top cover is pivoted, the catch of the cover engages with the locating member, thereby interlocking the top cover and the side cover detachably;
    wherein the computer enclosure further comprises a pair of elastic components for moving the locating member to an original position;
    wherein the locating member is formed to have a pair of positioning posts for the elastic components being disposed thereon respectively; and
    wherein the side cover forms a pair of positioning tabs with locating holes defined therein respectively, the positioning costs of the locating member extend through the locating holes of the positioning tabs respectively.

2. The computer enclosure as recited in claim 1, wherein the locating member further forms a stopping tab, and the side cover defines a cutout therein for extension of the stopping tab therethrough.

3. The computer enclosure as recited in claim 2, further comprising a button for resisting against the stopping tab.

4. The computer enclosure as recited in claim 1, wherein the locating member forms at least one insert tab, and the side cover defines at least one through slat for extension of the insert tab therethrough.

5. The computer enclosure as recited in claim 1, wherein the locating member has a horizontal portion, and the side cover defines an elongated opening for extension of the horizontal portion therethrough.

6. The computer enclosure as recited in claim 1, wherein one end of the top cover is bent vertically to form a flange, and the catch is formed on a bottom end of the flange.

7. The computer enclosure as recited in claim 1, wherein the locating member defines at least one latching opening therein, and the catch engaging in the at least one latching opening detachably.

8. A computer enclosure comprising:
    a chassis;
    a top cover pivotally mounted to the chassis, the top cover having a catch bent from an end of the top cover;
    a side cover mounted to the chassis, the side cover, the chassis, and the top cover configuring a receiving space for accommodating other components;
    a locating member slidably mounted on the side cover, the catch engaging with the locating member, and;
    at least one elastic component urging the locating member to move towards an original position, whereby when the top cover is pivoted, the catch of the top cover engages with the locating member, thereby interlocking the top cover and the side cover detachably;
    wherein the locating member defines at least one latching opening therein, and the catch engages in the at least one latching opening.

9. The computer enclosure as recited in claim 8, wherein the locating member is formed to have at least one positioning post for the elastic component being disposed thereon.

10. The computer enclosure as recited in claim 9, wherein the side cover forms at least one positioning tab with a locating hole defined therein, and the positioning post extends through the locating hole.

11. The computer enclosure as recited in claim 8, wherein the locating member forms a stopping tab, and the side cover defines a cutout for extension of the stopping tab therethrough.

12. The computer enclosure as recited in claim 8, wherein the locating member has a horizontal portion, and the side cover defines an elongated opening for extension of the horizontal portion therethrough.

13. The computer enclosure as recited in claim 8, wherein the locating member forms at least one insert tab, and the side cover defines at least one through slot for extension of the insert tab therethrough.

\* \* \* \* \*

UNITED STATES PATENT AND TRADEMARK OFFICE
CERTIFICATE OF CORRECTION

PATENT NO. : 7,604,305 B2  Page 1 of 1
APPLICATION NO. : 11/321586
DATED : October 20, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 965 days.

Signed and Sealed this

Fifth Day of October, 2010

David J. Kappos
*Director of the United States Patent and Trademark Office*